US012597275B2

(12) United States Patent
Miwa

(10) Patent No.: US 12,597,275 B2
(45) Date of Patent: Apr. 7, 2026

(54) VEHICLE INTERIOR MONITORING SYSTEM

(71) Applicant: TOYOTA JIDOSHA KABUSHIKI KAISHA, Toyota (JP)

(72) Inventor: Keisuke Miwa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 18/126,008

(22) Filed: Mar. 24, 2023

(65) Prior Publication Data

US 2023/0306757 A1 Sep. 28, 2023

(30) Foreign Application Priority Data

Mar. 28, 2022 (JP) ................................. 2022-051120

(51) Int. Cl.
| *G06V 20/59* | (2022.01) |
| *B60R 1/29* | (2022.01) |
| *G06V 20/56* | (2022.01) |

(52) U.S. Cl.
CPC .............. *G06V 20/597* (2022.01); *B60R 1/29* (2022.01); *G06V 20/56* (2022.01)

(58) Field of Classification Search
CPC ........... G05B 2219/31006; G06T 2207/30248; G06V 20/597; G06V 20/56; B60R 1/29
See application file for complete search history.

(56) References Cited

U.S. PATENT DOCUMENTS

| 2011/0043341 A1 | 2/2011 | Kumagami |
| 2021/0107421 A1 | 4/2021 | Uno |
| 2021/0264192 A1 | 8/2021 | Eki |

FOREIGN PATENT DOCUMENTS

| CN | 101998113 A | 3/2011 |
| EP | 2397386 A1 | 12/2011 |
| JP | 2003-333388 A | 11/2003 |
| JP | 2004-142660 A | 5/2004 |
| JP | 2012-001191 A | 1/2012 |
| JP | 2020-003936 A | 1/2020 |
| JP | 2020-025261 A | 2/2020 |
| WO | 2018/225775 A1 | 12/2018 |

OTHER PUBLICATIONS

Background-Foreground Segmentation for Interior Sensing in Automotive Industry by Drygala et al., Pub: Arxiv Sep. 20, 2021 (Year: 2021).*
Intrusion detection by Cai et al., Pub IEEE 2017 (Year: 2017).*

* cited by examiner

*Primary Examiner* — Gregory A Morse
*Assistant Examiner* — Ty Mitchell Beatty
(74) *Attorney, Agent, or Firm* — Dinsmore & Shohl LLP

(57) ABSTRACT

A vehicle interior monitoring system monitors the behavior of a passenger, based on the image of the interior of the vehicle, captured on a camera. A masking unit of the processor masks a portion of the image captured on the camera, the portion corresponding to the outside of the vehicle.

5 Claims, 3 Drawing Sheets

VEHICLE INTERIOR MONITORING SYSTEM

CROSS REFERENCE TO RELATED APPLICATION

This application claims priority to Japanese Patent Application No. 2022-51120 filed on Mar. 28, 2022, which is incorporated herein by reference in its entirety including the specification, claims, drawings, and abstract.

TECHNICAL FIELD

The present disclosure relates to a vehicle interior monitoring system for monitoring the behavior of a passenger of a vehicle, based on the images of the interior of the vehicle, captured on a camera.

BACKGROUND

For an autonomous driving bus or the like, it is suggested that images of the interior of the vehicle are captured on a camera to monitor the interior for the purpose of safety of passengers. For example, JP2020-003936A suggests a control method for detecting a passenger at high risk of falling to achieve smooth operation while preventing the passenger from falling.

In the case where images of people are captured on a camera, it is necessary to protect privacy of the people. Specifically, in capturing images of the interior of a bus, it should be considered that it is necessary to explain that images of the interior of the bus are captured on a camera to be used for the purpose of safe operation of the bus, and to get consent from the passengers in advance.

Here, such a bus has windows so that the passengers can see outside the bus through the windows. In capturing images of the interior of the bus, it may happen that people outside the bus are shown in the captured images. It is, however, difficult to get consent from those people outside the bus. Hence, it is necessary to take measures to protect privacy of such people outside the bus.

SUMMARY

According to an aspect of the present disclosure, there is provided a vehicle interior monitoring system for monitoring the behavior of a passenger, based on an image of the inside of the vehicle, captured on a camera, and masking a portion of the image captured on the camera, the portion corresponding to the outside of the vehicle.

Determination as to whether a portion corresponds to the outside of the vehicle may be made through depth estimation of an image.

Determination as to whether a portion corresponds to the outside of the vehicle may be made exclusively with respect to a window section.

An image shown on a portion corresponding to the outside of the vehicle may be automatically discarded.

A person or an object located outside the vehicle and seen in an image captured on a camera is masked. This makes it possible to appropriately respond to the private policy for those people outside the vehicle.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described based on the following drawings. The present disclosure is not limited to the embodiment described here.
"Complete Structure"

A vehicle that carries a vehicle interior monitoring system according to the present embodiment is a bus that runs along a predetermined route with a user on board as a passenger. Such a bus is assumed to be an autonomous driving vehicle capable of automatic acceleration, deceleration, and steering. The vehicle interior monitoring system is also applicable to a semi-autonomous driving vehicle and a normal vehicle to be driven by a driver. Bus stops are provided along the route, in addition to a start point and a terminal point. The bus automatically may stop and depart at each bus stop.

Such a vehicle needs to be monitored for the situation inside the vehicle or the like by an operation management center. For example, to open or close the door, it is necessary to detect a passenger, if any, standing near the door and to make sure that the passenger stands clear of the door by a predetermined distance, before opening or closing the door. Also, when a passenger has gotten on board, it is necessary to confirm that the passenger has completed the motion of getting on board and gotten ready for the bus to start before starting the bus. In such a case, an announcement, such as "The bus starts moving," may be automatically made before starting the bus. If any passenger should stand up from his/her seat while the bus is running, an alert is given or the bus may run at a reduced speed.

The vehicle interior monitoring system 10 according to this embodiment is mounted on an autonomous driving vehicle, and sends an image of the interior, or inside, of the vehicle, captured on a camera, to the operation management center. The operation management center monitors the image (in general, a motion image) having been sent, of the interior of the vehicle, and controls the running of the autonomous driving vehicle.

Figure 1:
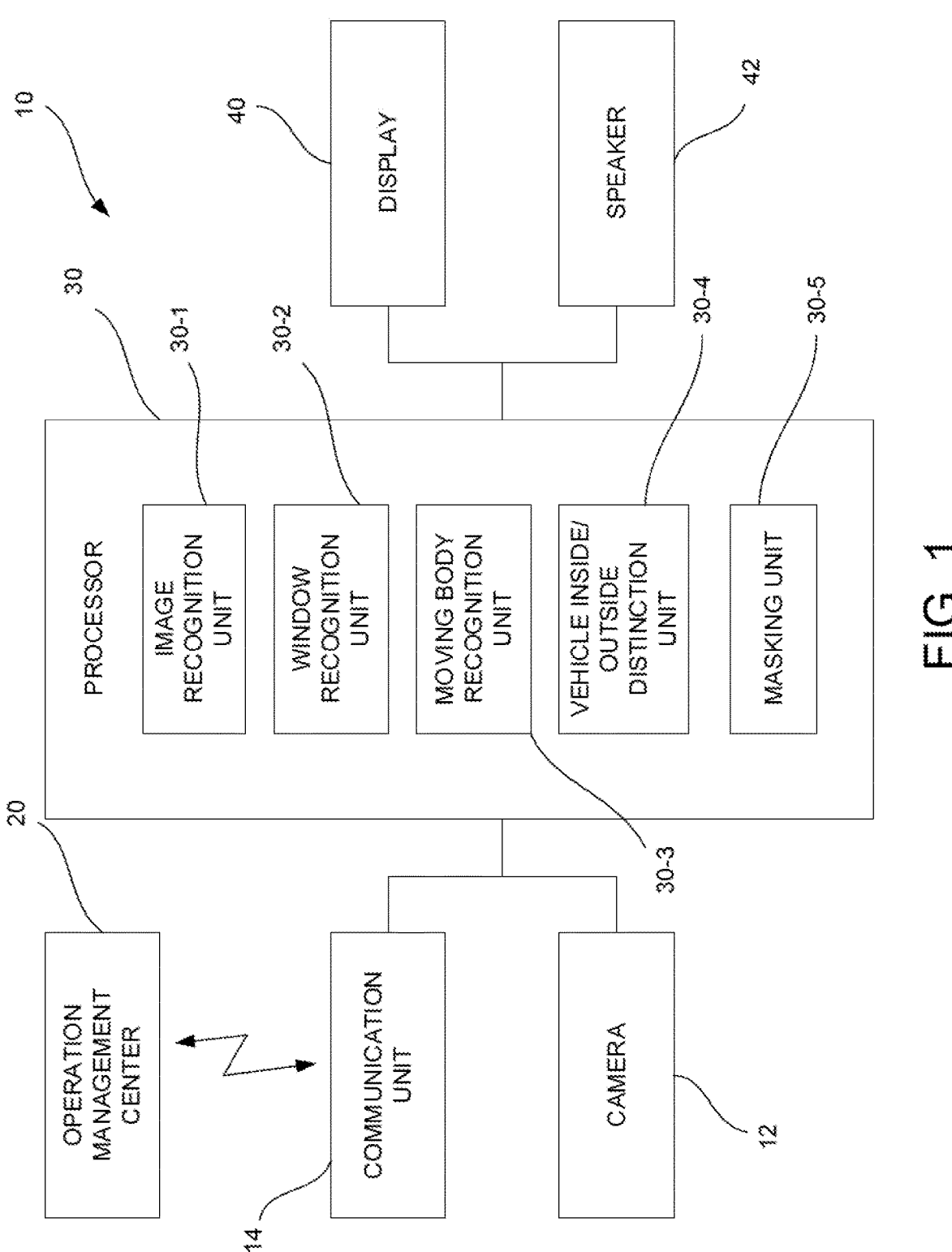
FIG. 1 is a block diagram of the complete structure of a vehicle interior monitoring system 10.

FIG. 1 is a block diagram of the complete structure of a vehicle interior monitoring system 10. The vehicle interior monitoring system 10 has a camera 12, which captures an image of the interior of the vehicle, a display 40, and a speaker 42. Two or more cameras may be provided. Note that the images captured on the camera 12 are generally motion image data, and that high-resolution still image data may be additionally obtained. The vehicle interior monitoring system 10 has a communication unit 14 that can communicate with the operation management center 20 that manages the operation of the vehicle and/or a portable terminal of a user, utilizing communication via a communication line, such as radio communication (including direct radio communication for a short distance), the Internet, or the like. As described above, the operation management center 20 manages the autonomous running of a vehicle.

The camera 12 and the communication unit 14 are connected to a processor 30. The processor 30 controls processing to be applied to the images captured on the camera 12 and exchange of necessary information with respect to the operation management center 20.

The processor 30 includes a computer, and executes various kinds of data processing. The processor 30 functionally includes an image recognition unit 30-1, a window recognition unit 30-2, a moving body recognition unit 30-3, a vehicle inside/outside distinction unit 30-4, and a masking unit 30-5.

The image recognition unit 30-1 executes processing such as edge recognition with respect to an image captured on the camera 12 to recognize the contours of various objects.

The window recognition unit 30-2 stores an image of the interior of the vehicle as a default image when the camera 12 is installed in the vehicle or before the bus begins operation. The window recognition unit 30-2 also stores the position of a window section in the image of the interior of the vehicle, so that a window section in an image obtained while the bus is operating can be recognized, based on the data from the window recognition unit 30-2. A window frame portion is recognizable in advance, by referring to a default image. In the case that a curtain is hung in a window, an image of a window with the curtain may be stored in advance to be used in recognition of the curtain.

The moving body recognition unit 30-3 recognizes a moving body, referring to successive images, and traces the moving body. In tracing, an image of the interior of the vehicle having been taken in advance is also usable. For example, a moving body is recognizable based on a differential image between images taken at different time points. Such kind of recognition of a moving body enables recognition of a passenger.

The vehicle inside/outside distinction unit 30-4 determines whether an object shown in an image of a window section is located inside the vehicle or outside the vehicle. Note that a stationary object located outside the vehicle, which moves relatively while the bus is running, is recognized as a moving body.

Whether an object shown in an image is located inside the vehicle or outside of the vehicle is basically determined through depth estimation. Although depth estimation is possible using an image captured on the camera 12, depth estimation is possible also by using other technology, not necessarily being limited to use of an image captured on the camera 12.

An image of the interior of the vehicle, reflected on a window can be determined as a reflection image, based on the distance to the object of which image is reflected. A reflection image may be left shown as is or deleted instead. An anti-reflection processing can be applied to the inside surface of a window.

The masking unit 30-5 masks a portion of an image of a window section, the portion showing an image of an object other than an object located inside the vehicle, to thereby delete the image shown on the portion. Specifically, mosaic processing, white painting, or black painting is usable for masking. Various masking software is available.

As to images captured on the camera 12, an image of an object located inside the vehicle and an image corresponding to the outside of the vehicle can be discriminated for every pixel, and a portion corresponding to the outside of the vehicle is masked. Alternatively, the entire window section may be masked once, and an image of an object located inside the vehicle may be then superimposed on the masked window section. Alternatively, a portion corresponding to the outside of the vehicle; that is, a portion other than a portion corresponding to the inside of the vehicle, may be masked.

Note that an image before being masked; that is, an image containing an image corresponding to the outside of the vehicle, is discarded upon completion of masking processing so as not to be stored.

Although it is described in the above that an image obtained from the camera 12 is processed and masked in the processor 30 mounted on the vehicle, an image captured on the camera 12 may be sent to an outside server computer, such as a server computer in the operation management center 20, so that the outside server computer processes the image to produce a masked image.

<Depth Estimation (Estimation of Distance from Camera 12 or Other Sensors)>

Depth estimation can be implemented using the following technology.

Depth Estimation Using Motion Capture Function to Focus on Only a Person in a Vehicle A passenger on board is asked to wear a sensor so that the behavior of the passenger is determined based on a signal from the sensor to thereby recognize the passenger in the vehicle. This enables accurate recognition, but requires asking a passenger to wear a sensor. A sensor may be incorporated in a ticket or a smartphone, so that the vehicle interior monitoring system 10 can recognize a passenger and his/her sensor when the passenger is getting on board.

Depth Estimation Using Time-of-Flight (TOF) Camera

The distance to an object is measured using a laser. This enables recognition of an object located outside the vehicle. As data obtained on a TOF camera is a signal relevant to a distance, a separate camera is necessary for remote monitoring by a person.

Depth Estimation Using a Stereo Camera

If images captured on two or more cameras are obtained, the distance to the object of which image has been captured can be easily measured. This makes the most reliable depth estimation, but requires two or more cameras, which leads to a high-cost system.

Depth Estimation Using a Monocular Camera

Use of a monocular camera enables various suggestions for depth estimation, through mechanic learning. Depth estimation using a monocular camera is less accurate than that using a stereo camera, but has a merit in view of costs.

For machine learning, for example, a method referred to as board calibration is available. In board calibration, various parameters for a camera to capture an image are determined, using an object having a checkerboard-like appearance, to measure the size of an object of which image is captured. Alternatively, a method referred to as semantic segmentation is available. In semantic segmentation, a label or a category is made associated with each of the pixels constituting an image to identify what the pixel shows, to thereby recognize an object shown in an image as a busman, a passenger, or the like.

Using the method described above, a busman, a passenger, scenery outside a window, and the like are learned by referring to an image captured on a monocular camera, so that a busman, a passenger, scenery outside a window, or the like can be recognized.

As the purpose of depth estimation here is basically recognition of an object located outside the vehicle and an object located inside the vehicle among the objects shown in an image of the inside of a window section, an object, if any, continuing from the inside to outside of the vehicle can be determined as an object located inside the vehicle. This type of determination is additionally usable.

A door for boarding and getting off the bus is predetermined so that a passenger gets on or off the bus through the door. This allows recognition of a moving body since immediately after the moving body has gotten on the bus and tracing of the moving body thereafter to thereby recognize that an object shown in the image of the inside of the window section is an object located inside the vehicle (that is, a busman or a passenger).

"Procedure for Masking"

Figure 2:
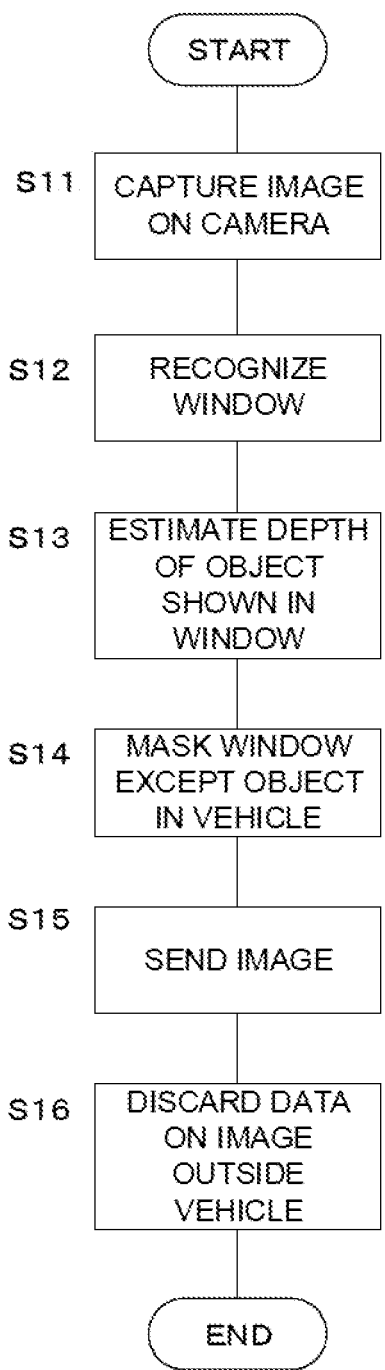
FIG. 2 is a flowchart of an exemplary image processing to be executed by the processor 30 to process an image captured on a camera 12.

FIG. 2 is a flowchart of exemplary processing to be executed by the processor 30 to an image captured on the camera 12.

Initially, an image is obtained from the camera 12 (S11). The window recognition unit 30-2 reads the position of a window section, stored in advance, and recognizes the position of the window section in the image (S12). The vehicle inside/outside distinction unit 30-4 executes depth estimation with respect to an object shown in an image of the inside of the window section (S13). As described above, since depth estimation is executed exclusively to the inside of the window section, the amount of data to be processed can be limited. Specifically, by processing the image of the inside of the window section, the depth of each object shown in the image is estimated. In other words, the distance to each object of which image is included in the image of the inside of the window section is determined, using the above-described various methods. Basically, the distance to each of the pixels (the distance between an object and each of the imaging elements) constituting the image of the inside of the window section is estimated. Use of a result of determination as to whether an object is a moving body, obtained by the moving body recognition unit 30-3, makes it possible to recognize the behavior of a passenger.

Note that a portion corresponding to the sky in an image corresponding to the outside of the vehicle is a portion with no object present, and a pedestrian is an object located outside the vehicle. The distances to these differ significantly. Depth estimation here is only required to discriminate between an object located further outward than a window and an object located further inward than the window, and thus a very accurate measurement of the distance to each object is not necessary. In other words, an area with a depth that cannot be a depth of an object located inside the vehicle is determined as an area outside the vehicle. That is, the depth of the entire window section is determined, and a portion with a depth equal to or less than a predetermined depth can be extracted to be determined as an object located inside the vehicle.

In the case where the depth of an image captured on a monocular camera is estimated using a machine learning model, a well-learnt model enables instant and accurate determination as to whether an object is located inside or outside the vehicle.

In measurement of a distance as well, as the position of a window is known, an object located outside the vehicle can be discriminated from an object located inside the vehicle by using of depth estimation.

After determination is completed as to whether an object is located inside or outside the vehicle, the masking unit 30-5 masks the window section in the image, except for an object located inside the vehicle (S14).

For masking, an area excluding a portion showing an image of an object located inside the vehicle may be masked, as described above. Alternatively, an image of an object located inside the vehicle is extracted before masking the entire window section, the entire window section is then masked, and the extracted image of the object located inside the vehicle is thereafter superimposed on the masked window section.

The resultant image with an object located outside the vehicle being masked is sent to the operation management center 20 outside the vehicle (S15). The resultant image may be displayed on the display 40 in the vehicle when an operator is on board. The image can be displayed even when no operator is no board.

The data on the image sent to the operation management center are stored in the operation management center, and the data may be stored in the vehicle interior monitoring system 10 as well. Meanwhile, the data obtained from the camera 12; that is, data on an image before masking, are now automatically discarded (S16). That is, image data on a portion corresponding to the outside of the vehicle, which can raise a problem in view of privacy policy, are automatically discarded, so that it is possible to appropriately respond to the privacy policy.

"State of Masking"

Figure 3:
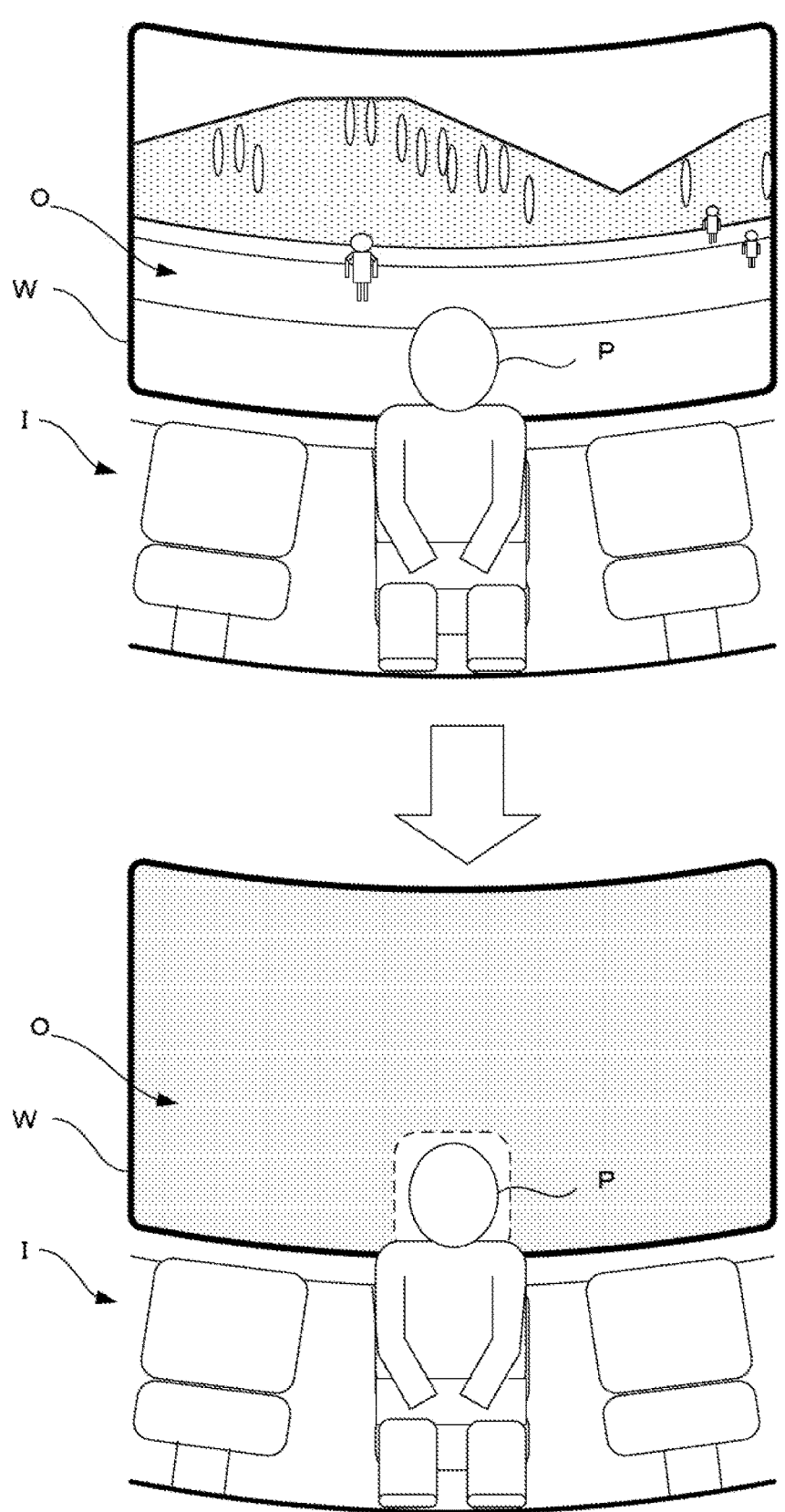
FIG. 3 illustrates respective images before and after masking.

FIG. 3 illustrates an image before masking and an image after masking. An image before masking includes a passenger P located in the inside I of the vehicle and scenery O outside the vehicle. Specifically, the passenger P is present before the window W, specifically, at a position closer to the viewer than the window W. The scenery O is seen through the window W. This image of the window W section is masked except for a portion corresponding to the passenger P located in the vehicle, as illustrated with small dots in FIG. 3. Note that, in this example, a thin area surrounding the passenger P, or an object located inside the vehicle, is subjected to masking in a different manner. This facilitates masking processing, and makes the passenger P more recognizable. Alternatively, this thin area may be left unmasked with an image outside the vehicle shown therein, as such a small area will not raise a problem in view of privacy policy. Needless to say, such an area surrounding an object located inside the vehicle is not mandatory, and an image of an object located inside the vehicle may be simply displayed in the masked area without such a surrounding area.

The invention claimed is:

1. A vehicle comprising:
a vehicle interior monitoring system for monitoring a behavior of a passenger, the vehicle interior monitoring system comprising:
a camera for capturing an image of an inside of a vehicle; and
a processor configured to:
process the image of the inside of the vehicle, the image being captured on the camera,
mask a portion of the image captured on the camera except for an area corresponding to the passenger located in the vehicle such that the portion masked corresponds to outside of the vehicle; and
determine whether the portion of the image corresponds to the outside of the vehicle exclusively with respect to a window section, the window section being a vehicle window and a position of the window section in the image of the inside of the vehicle is stored in advance such that the window section in the image obtained while the vehicle is operating can be recognized.

2. The vehicle according to claim 1, wherein the processor is configured to:
determine whether the portion corresponds to the outside of the vehicle by using estimation of the image.

3. The vehicle according to claim 1, wherein the processor is further configured to:
automatically discard an image shown on the portion corresponding to the outside of the vehicle.

4. The vehicle according to claim 2, wherein the processor is further configured to:

automatically discard an image shown on the portion corresponding to the outside of the vehicle.

5. A vehicle interior monitoring system for monitoring a behavior of a passenger based on an image of a vehicle interior captured by a camera, the vehicle interior monitoring system comprising:

a camera for capturing an image of an inside of a vehicle to obtain a vehicle interior image; and a processor configured to:

process the image of the inside of the vehicle;

recognize a window region in the vehicle interior image obtained by the camera using a stored position of the window region;

perform depth estimation on the vehicle interior image of the recognized window region and separates a portion corresponding to the vehicle interior and a portion corresponding to an exterior of the vehicle; and mask processing on the portion corresponding to the exterior of the vehicle and excluding an area of the portion corresponding to the vehicle interior that represents the passenger in the image captured by the camera.

\* \* \* \* \*